W. D. COOLIDGE.
METHOD OF UNITING METALS.
APPLICATION FILED MAR. 4, 1914.

1,162,340.

Patented Nov. 30, 1915.

Witnesses:

Inventor:
William D. Coolidge,
by Albert G. Davis
His Attorney.

UNITED STATES PATENT OFFICE.

WILLIAM D. COOLIDGE, OF SCHENECTADY, NEW YORK, ASSIGNOR TO GENERAL ELECTRIC COMPANY, A CORPORATION OF NEW YORK.

METHOD OF UNITING METALS.

1,162,340.  Specification of Letters Patent.  Patented Nov. 30, 1915.

Original application filed March 20, 1912, Serial No. 685,113. Divided and this application filed March 4, 1914. Serial No. 822,250.

*To all whom it may concern:*

Be it known that I, WILLIAM D. COOLIDGE, a citizen of the United States, residing at Schenectady, county of Schenectady, State of New York, have invented certain new and useful Improvements in Methods of Uniting Metals, (division of my application Serial No. 685,113, filed March 20, 1912,) of which the following is a specification.

My invention comprises a method of joining or soldering tungsten to other metals, so as to obtain most intimate, strong mechanical junction which will therefore have the best electrical and heat conductivity.

Tungsten cannot be joined satisfactorily to other metals by soldering in the ordinary manner. This difficulty is apparently due to the ease with which a thin film of oxid forms on the surface of the tungsten. The soldering metal either will not stick or when apparent adhesion has been produced I find that when subjected to any strain the soldering metal breaks away as though the tungsten broke away from the film of oxid.

My invention relates broadly to a method of joining or soldering tungsten either for contacts or for any other purpose to copper, to form a unitary structure.

Figure 1:
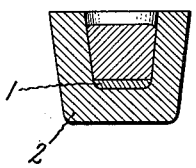
Figure 2:
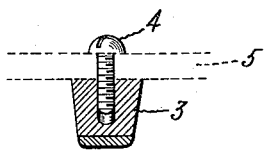

In the accompanying drawings, Figure 1 shows a body of copper cast directly into contact with a piece of tungsten; and Fig. 2 shows a machined contact attached to a support.

In carrying out the process, I find it highly desirable to completely remove from the surface of the tungsten body all the loosely adherent metal or oxid which I find is left by the preliminary process of shaping the tungsten. Unless this is done, I find that in some cases the tungsten may be torn away from its backing or support at this loosely adherent surface layer, part of which will be found clinging to the copper or other metal used as solder. In order to remove this surface layer I prefer to bring the body of tungsten into contact with melted nitrite of sodium or potassium for a few seconds or with hot caustic potash or caustic soda solution for a longer time. This leaves a perfectly bright surface of solid metal.

Ordinarily copper by reason of its dissolved gases or other impurities will not wet the surface of tungsten. Either the tungsten acts as a deoxidizer with respect to the copper and becomes coated with oxid, or dissolved oxids of copper lower the surface tension of copper relatively to tungsten. According to the present process the copper is caused to unite autogenically with a tungsten body by heating to a temperature considerably above the melting point of copper in a vacuum preferably to a temperature about 1400 deg. C. Under these conditions an oxid of tungsten cannot exist, the oxid at this temperature being dissociated into metallic tungsten and oxygen. The copper itself appears to lose at least part of its dissolved gases.

The operation may be carried out by placing a body of tungsten and a quantity of copper in a crucible, as shown in Fig. 1, and heating the crucible and its contents in a vacuum furnace such as shown in Arsem Patent No. 785,535. After being heated to the required temperature the copper and tungsten are simply allowed to cool in contact with each other. Upon removal from the crucible, the copper may be machined.

What I claim as new and desire to secure by Letters Patent of the United States, is:—

1. The method of promoting the adhesion or wetting of molten copper to the surface of a body of tungsten which consists in heating said copper in contact with the tungsten in a vacuum at a temperature materially above the melting point of copper.

2. The method of promoting the adhesion or wetting of molten copper to the surface of a body of tungsten which consists in heating said copper in contact with the tungsten in a vacuum at a temperature of about 1400 deg. C. and allowing the tungsten and copper to cool while in contact.

3. The method of producing a composite metal body, one of the metals being copper and the other tungsten, which consists in simultaneously heating the copper in contact with the tungsten body in a vacuum at a temperature materially above its melting point and allowing the copper to solidify in a vacuum.

In witness whereof, I have hereunto set my hand this 27th day of February 1914.

WILLIAM D. COOLIDGE.

Witnesses:
 HELEN ORFORD,
 MARGARET E. WOOLLEY.